UNITED STATES PATENT OFFICE.

ARTHUR LINZ, OF NEW YORK, N. Y., ASSIGNOR TO ULTRO CHEMICAL CORPORATION, OF NEW YORK, N. Y., A CORPORATION OF NEW YORK.

COLORS.

1,358,007.  Specification of Letters Patent.  Patented Nov. 9, 1920.

No Drawing.  Application filed September 9, 1920. Serial No. 409,050.

*To all whom it may concern:*

Be it known that I, ARTHUR LINZ, a citizen of the United States, residing in New York city, county of New York, borough of Manhattan, and State of New York, have invented certain new and useful Improvements in Colors, of which the following is a full, clear, and exact specification.

My invention relates to colors and refers particularly to colors comprising metallic compounds of organic coloring matters.

I have discovered that a yellow acid wool dyestuff produced by combining diazotized para-nitro-ortho-toluidin and 2-naphthol 3:6 disulfonic acid can be converted into valuable colors and lakes by treating the said dyestuff with metallic salts in order to form a compound therewith.

The compound produced as above from diazotized para-nitro-ortho-toluidin and 2-naphthol 3:6 disulfonic acid when converted into its univalent salts, such as sodium or potassium, is a dye, soluble in water, and hence, not an insoluble lake.

I have found, however, that if the dyestuff compound be treated with solutions of a number of multivalent metals, that is, those metals having a greater valency than one, new compounds are formed, many insoluble in water and in many organic chemicals. Lakes of this character, therefore, are of great value in the production of inks, paints and similar commercial products.

I have further discovered that when the above described yellow dyestuff is treated with a barium compound a most unexpected result is obtained, in that the yellow dyestuff is converted into a brilliant clear scarlet lake.

The following is an example of the method of producing this particular barium lake:—

100 pounds of a 20% paste of the sodium salt of the color producible from diazotized para-nitro-ortho-toluidin and 2-naphthol 3:6 disulfonic acid are finely suspended, or dissolved, in water, and a solution of 20 pounds of barium chlorid is added with constant stirring. The whole is then heated to boiling and this temperature maintained for a short time. The red lake thus formed is filtered off, washed, dried and ground. A substratum, such as barium sulfate, aluminium hydrate, whiting, gypsum, etc., may be employed in the manner usual in the formation of lakes upon such substances. The lake thus formed is notable for its brilliancy, its fastness to light and its insolubility in water and in many organic compounds, such as benzol, toluol, linseed oil, etc. The lake, when thickly applied, gives shades of a brilliant clear scarlet with metallic luster, and when thinly applied, it gives shades of a very pure blue-red shade. Reduction of the lake produces para-nitro-ortho-toluidin and 4-amino-2-naphthol 3:6 disulfonic acid.

The barium chlorid, mentioned in the above example, may be substituted by solutions of the other multivalent metals for the production of compounds of various colors and shades.

I do not limit myself to the particular chemicals, amounts, temperatures or mode of procedure described, all of which may be varied without going beyond the scope of my invention as described and claimed.

What I claim is:—

1. The process of producing a color which comprises treating the dyestuff producible from diazotized para-nitro-ortho-toluidin and 2-naphthol 3:6 disulfonic acid with a multivalent metal.

2. The process of producing a lake which comprises treating the dyestuff producible from diazotized para-nitro-ortho-toluidin and 2-naphthol 3:6 disulfonic acid with a solution of a multivalent metal.

3. The process of producing a lake which comprises treating the dyestuff producible from diazotized para-nitro-ortho-toluidin and 2-naphthol 3:6 disulfonic acid with a barium compound.

4. The process of producing a lake which comprises treating the dyestuff producible from diazotized para-nitro-ortho-toluidin and 2-naphthol 3:6 disulfonic acid with a solution of barium chlorid.

5. The color capable of being produced by treating the dyestuff producible from diazotized para-nitro-ortho-toluidin and 2-naphthol 3:6 disulfonic acid with a multivalent metal which, upon reduction, yields para-nitro-ortho-toluidin and 4-amino-2-naphthol 3:6 disulfonic acid.

6. The lake capable of being produced by treating the dyestuff producible from diazotized para-nitro-ortho-toluidin and 2-naphthol 3:6 disulfonic acid with a solution of a multivalent metal which, upon reduction, yields para-nitro-ortho-toluidin and 4-amino-2-naphthol 3:6 disulfonic acid.

7. The red lake capable of being produced by treating the dyestuff producible from diazotized para-nitro-ortho-toluidin and 2-naphthol 3:6 disulfonic acid with a barium salt, which is insoluble in water, benzol, toluol and linseed oil and which, upon reduction, yields para-nitro-ortho-toluidin and 4-amino-2-naphthol 3:6 disulfonic acid.

8. The red lake capable of being produced by treating the dyestuff producible from diazotized para-nitro-ortho-toluidin and 2-naphthol 3:6 disulfonic acid with a solution of barium chlorid, which is insoluble in water, benzol, toluol and linseed oil and which, upon reduction, yields para-nitro-ortho-toluidin and 4-amino-2-naphthol 3:6 disulfonic acid.

Signed at New York city, in the county of New York and State of New York, this 8th day of September, 1920.

ARTHUR LINZ.